UNITED STATES PATENT OFFICE.

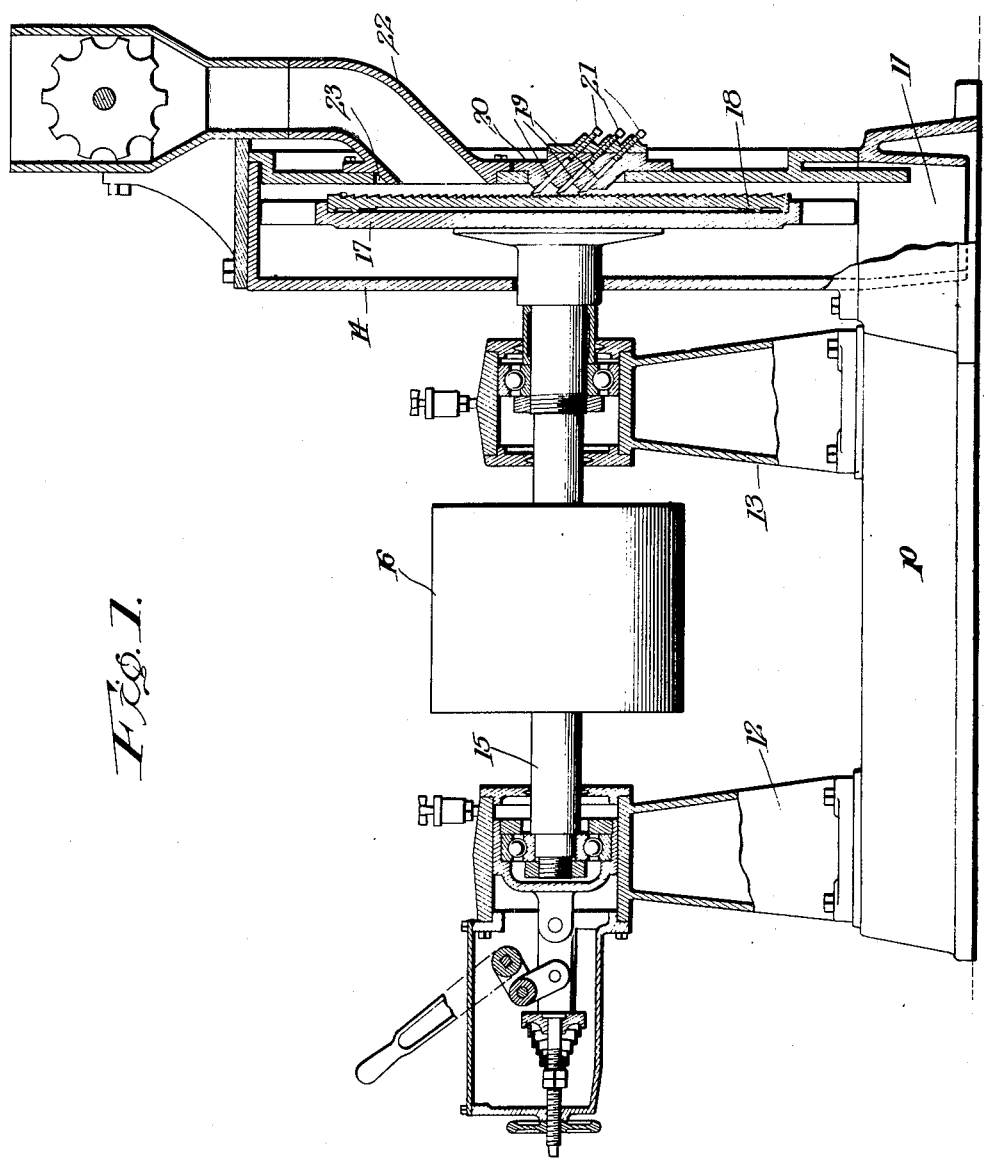

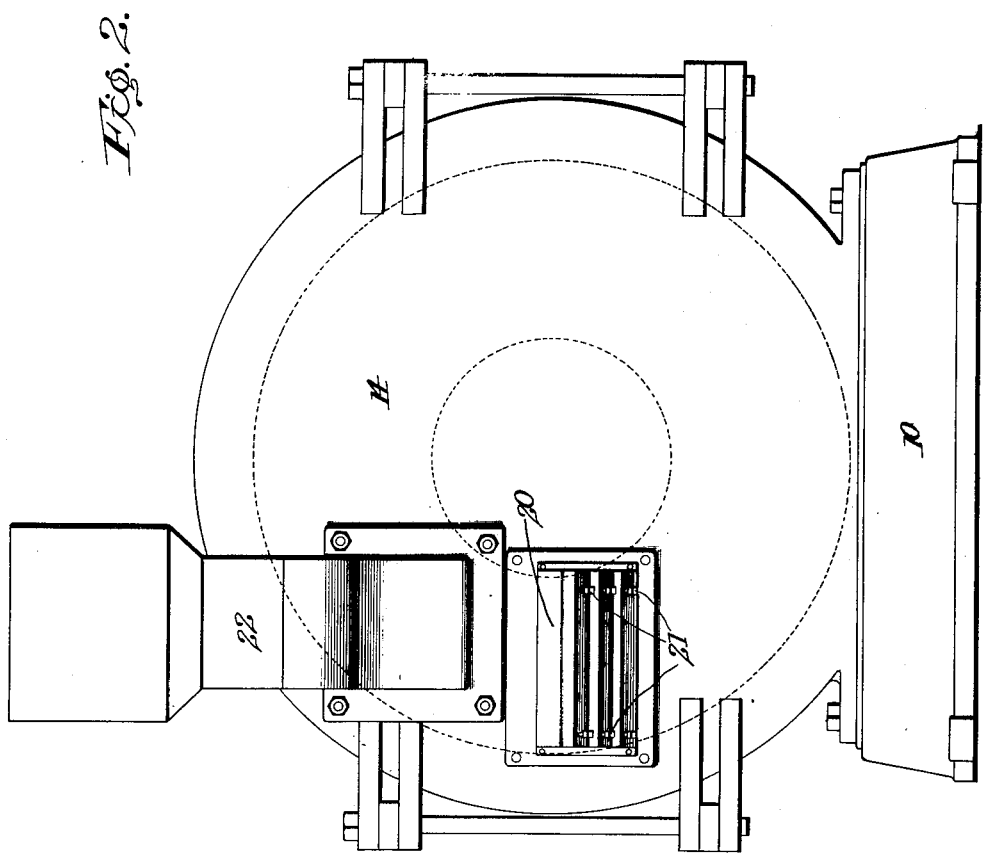

JAMES W. MOORE, OF EAST POINT, GEORGIA, ASSIGNOR TO ATLANTA UTILITY WORKS, OF EAST POINT, GEORGIA, A CORPORATION OF GEORGIA.

COTTON-SEED HULLER.

1,369,978.   Specification of Letters Patent.   Patented Mar. 1, 1921.

Application filed August 27, 1917. Serial No. 188,444.

*To all whom it may concern:*

Be it known that I, JAMES WAYNE MOORE, a citizen of the United States, and residing at East Point, Fulton county, State of Georgia, have invented certain new and useful Improvements in Cotton-Seed Hullers, of which the following is a specification.

This invention relates to cotton seed hullers, and has for its object to provide a device of this class which will cut the hulls from the meats without crushing out any of the oils, and which will produce a cleaner and more efficient separation of hulls and meats than other types of hullers heretofore suggested.

The invention will be fully disclosed in the following description, taken in connection with the accompanying drawings, in which,—

Figure 1 represents a side view of the huller, part being shown in section; and

Fig. 2 represents an end elevation, looking toward the left in Fig. 1.

The base 10 of the huller is substantially rectangular in shape and has an opening 11 at one end, extending downwardly therethrough which permits the portions of the hulls and meats to fall from the hulling mechanism, immediately above the opening, to a suitable receptacle below.

To the base 10 are bolted the pedestals 12 and 13 and the casing 14 which incloses the hulling mechanism. The pedestals 12 and 13 support the horizontal shaft 15, which bears the pulley 16 adapted to be connected to a source of power by a suitable belt. The hulling mechanism within the casing 14 comprises a revoluble disk 17 having a corrugated or ribbed plate 18 set in the face thereof, and the knives 19 secured to the wall of the casing, and extending toward the corrugated face of the disk for the purpose of cutting cotton seed passing therebetween.

The cutting knives are preferably three in number and are upwardly inclined, with their edges horizontally disposed and close to the face of the disk. The edge of the middle knife is preferably radial to the disk. The knives are secured in the slotted metal block 20, which is bolted to the end wall of the casing in such manner that it may be readily removed, enabling the operator to inspect the cutting edges at any time. By means of adjusting screws 21, of which there are two for each knife, the edges of the knives may be nicely adjusted relatively to the revoluble disk.

Cotton seed is fed against the face of the corrugated disk by a chute 22 entering the casing through a suitable aperture 23 immediately above the knives 19. This chute 22 is also removably secured by bolts to the side of the casing 14.

In the operation of the huller the revoluble disk, which is mounted on the end of shaft 15, is caused to rotate rapidly and cotton seed is introduced continuously through the chute 22. The seed, pressing against the corrugated face of the disk, which of course is rotating downwardly past the mouth of the chute and the knives, is engaged by the radial ridges or corrugations and carried past the knives in a thin continuous stream. The seeds will be cut approximately in half, and under no circumstances will any one seed receive more than three cuts.

After passing the knives the portions of the hulls and meats fall through the opening in the bottom of the base 10 and are received in an appropriate receptacle. The actual cutting is done entirely by the knives 19 and not by the revolving disk, and due to the fact that the knives may be readily removed and sharpened, very keen edges may be continually presented to the seed. Due to this fact a very much cleaner cut is made than occurs in other machines; practically eliminating the undesirable mashing effect.

Because of this clean cutting of the seed the loss, due to the absorption of oil mashed out of the meat, is very much reduced, and fewer fine particles of hull produced. As coarse particles of hull are more easily separated from the meats than fine particles, it is apparent that this machine enables the oil mill to produce a cleaner and more efficient separation and, since the ammonia content in cotton seed meal is reduced by these particles of cotton seed hulls which cannot be separated from the meats, the ammonia control will be more efficient by the use of this huller than in machines naturally producing a greater per cent. of fine particles of hull.

The features of having the cutting knives set in a removable block, enables the operator to change knives and to keep the huller sharp with little labor. This promotes a cleaner separation and saves power, besides saving labor.

In Patent Number 1,116,611 issued November 10, 1914, to W. D. Nash, there is disclosed a disk cotton seed huller which is provided with mechanism permitting the disks to separate when foreign material such as stones or pieces of iron are caught therebetween. This mechanism I have shown in the appended drawings as I have found its use particularly desirable to save the knife edges, but have not described it in detail as it forms no part of the present invention, and may be fully understood by referring to the above mentioned patent.

Having thus described my invention, what is claimed is:—

In a cotton seed huller, a feed chute, a knife block, a series of knives adjustably secured in said knife block adjacent said feed chute, and a revoluble disk having projections on its face for engaging cotton seed at the feed chute and carrying it past the knives whereby it is given a plurality of cuts, said knives being arranged substantially radially to said disk and having their cutting edges inclined in a direction opposite the direction of rotation of the co-acting portion of the disk.

In testimony whereof I affix my signature.

JAMES W. MOORE.